March 27, 1934. S. WIDMER 1,953,033
RECTIFIER ELECTRODE SEAL
Filed Jan. 18, 1932
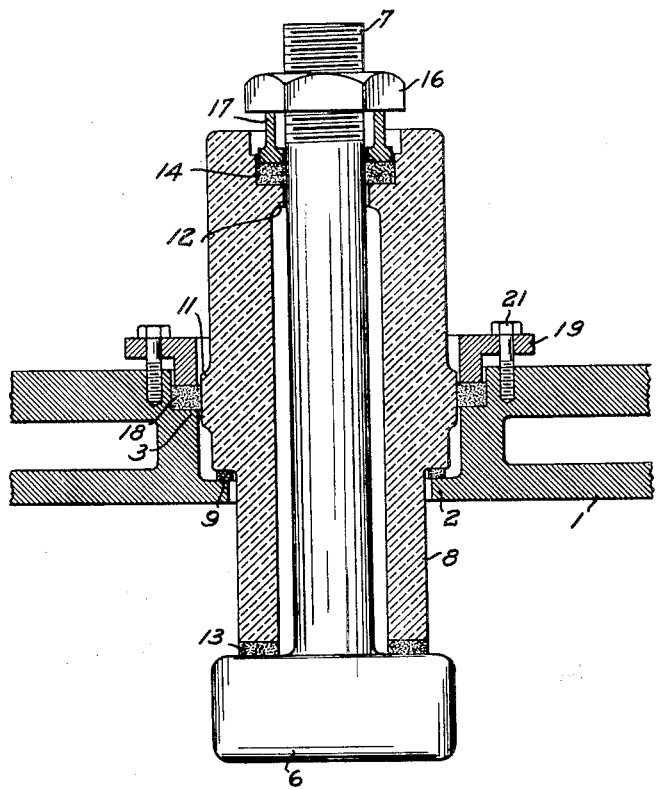
Inventor
S. Widmer
by G. J. Elwin
Attorney Patented Mar. 27, 1934

1,953,033

UNITED STATES PATENT OFFICE 1,953,033

RECTIFIER ELECTRODE SEAL

Stefan Widmer, Baden, Switzerland, assignor to Aktiengesellschaft Brown Boveri & Cie., Baden, Switzerland, a joint-stock company of Switzerland Application January 18, 1932, Serial No. 587,381
In Germany January 20, 1931

2 Claims. (Cl. 250—27.5)

This invention relates to improvements in electric current rectifiers of the metallic vapor arcing type and particularly to an anode construction for such rectifiers, and to means for sealing such anode structure into the tank of the rectifier without requiring the use of a fluid sealing medium.

The anodes of an electric current rectifier of the metallic vapor arcing type, in which the arcing action takes place within a metallic tank, extend into such tank from the exterior thereof in insulated relation therewith. The anodes and the insulators must be sealed in gas-tight relation with each other and with the tank for the reason that the tank must be maintained in highly evacuated condition to secure proper rectifying action therein. The insulators, being formed from heat resistive and substantially non-porous material such as porcelain or quartz, shrink and warp during manufacture and may deform or change their shape even during use. It is, therefore, difficult to produce an absolutely gas-tight connection between such insulators and the tank and between the insulators and the anodes by the use of solid sealing materials such as rubber or asbestos which must be put under pressure to secure the proper sealing action. If sufficient pressure is exerted on such materials to secure a gas-tight seal, the result is usually due to the large tolerances required for the insulators and the cross-sectional dimensional variations of the sealing material, that the exertion of pressure forces the sealing material away from the surfaces to be sealed into the spaces adjacent such surfaces. Such flowing of the sealing materials under pressure may be prevented if the surfaces to be sealed are parallel, if the sealing material gasket is made to fit closely between the surfaces to be sealed and if the free spaces adjacent the surfaces to be sealed are kept at a minimum size. Flowing of the sealing gasket from between the surfaces to be sealed decreases the quantity of material between the surfaces and causes the pressure exerted thereon to become insufficient thus permitting leakages. If the sealing material is under spring pressure repeated changes in the dimensions of the insulator or variations in the spring pressure may force sealing material entirely from between surfaces to be sealed.

It is therefore among the objects of the present invention to provide an anode structure for electric current rectifiers of the metallic vapor arcing type in which the anode structure is sealed into the tank of the rectifier without the use of fluid sealing material.

Another object of the invention is to provide an anode structure by which the anodes are sealed into an electric current rectifier of the metallic vapor type by means of a solid sealing material and in which the structure is so designed that the sealing material will be retained between the surfaces to be sealed regardless of the pressure exerted thereon.

Another object of the invention is to provide an anode structure for electric current rectifiers of the metallic vapor type in which a solid sealing material is used for the purpose of obtaining tight joints between the insulator and the tank and between the insulator and the anodes, the insulator being so formed that the amount of grinding required thereon to secure proper sealing surfaces is reduced to a minimum.

Another object of the invention is to provide a structure for sealing the anodes into an electric current rectifier of the metallic vapor type in insulated relation therewith in which structure the insulator is formed with flange like projections each forming one of the surfaces against which sealing material is pressed.

Objects and advantages other than those above set forth will be apparent from the following description when read in connection with the accompanying drawing which is a vertical sectional view, through an anode structure for an electric current rectifier of the metallic vapor arcing type illustrating one embodiment of the present invention.

Referring more particularly to the drawing by characters of reference, the reference numeral 1 designates a portion of the cover, or anode plate, of an electric current rectifier of the metallic vapor arcing type in which the rectifying action occurs within a metallic chamber. The plate 1 is provided with apertures therethrough which are formed to provide shoulders 2 and 3 of different sizes and on different diameters, of the apertures. An anode having a head portion 6 and a stem portion 7 extends through an insulator 8 which extends through the aperture in the top plate and is supported on a gasket 9 upon the shoulder 2 of the aperture. The insulator is formed with a plurality of flange like extensions 11 and 12, the edge of the extension 11 being ground to cooperate with the shoulder 3 to form a recess into which a solid sealing material is pressed. The ground portion of the extension 11 is exactly parallel with the opposite portion of the plate 1, the surfaces forming concentric cylindrical surfaces, and extends some distance above and below the horizontal surface of the shoulder. The edge of the extension 12 is ground to such size as to permit the circular anode stem 7 to extend therethrough in closely adjacent relation. The surface of the insulator above the extension 12 is ground exactly parallel with the surface of the anode stem and cooperates therewith to form a recess into which a solid sealing material is pressed. The anode head 6 is sealed against the lower end of the insulator 8 by a gasket 13 and the anode stem 7 is sealed into the insulator by an annular gasket 14 which seats on the extension 12 formed on the insulator. The gasket 14 is compressed by a nut 16 threaded on the upper end of the anode stem 7 through a follower 17. The pressure thus exerted on the gasket 14 forces the gasket to expand against the concentric surfaces provided by the anode stem and the main body of the insulator. Due to the very slight clearances between several portions and hence the very small top and bottom areas of the gasket not enclosed, the tendency for the gasket to flow from between the surfaces to be sealed is reduced to a minimum. The nut 16 also draws the anode head against gasket 13 thus serving as the support for the anode within the insulator and providing the necessary pressure to seal the head of the anode against the lower end of the insulator due to the pressure exerted on the gasket 13. The side wall of the insulator is sealed into the top plate 1 by means of an annular gasket 18 resting on the shoulder 3 and compressed between the portion of the plate defining the shoulder and the insulator extension 11 by a flanged ring 19 drawn downwardly by studs 21 threaded into the top plate. It will be seen that the top and bottom areas of the gasket 18 which are not in contact with a restraining surface are very limited thus reducing the tendency of the gasket to flow from between the concentric surfaces to be sealed.

The anode and insulating bushing structure of the invention above described produces means for sealing such anode and insulator into the top plate of an electric current rectifier in such manner that it is impossible for the solid sealing material gaskets to be forced from between the surfaces to be sealed. The portions of the insulator which need to be ground to form surface cooperating with other surfaces on other portions of the structure to form the seat for the sealing gasket are limited to the relatively small areas of the extensions of the insulator, the remaining portions of the insulator being so formed as not to require grinding.

Although but one embodiment of the present invention has been illustrated and described, it will be apparent to those skilled in the art that various changes and modifications may be made therein without departing from the spirit of the invention or from the scope of the appended claims.

It is claimed and desired to secure by Letters Patent:

1. In an electric current rectifier provided with a cover plate having an aperture therethrough formed with a plurality of shoulders having inner and outer parallel wall surfaces, an insulator having an aperture therethrough and supported on one of said shoulders, said insulator being formed with an outwardly extending flange intermediate the ends thereof having a wall surface parallel to the longitudinal axis thereof arranged closely adjacent and parallel to the said inner wall surface of another of said shoulders to form a recess and an inwardly extending flange having inner and outer wall surfaces parallel to the longitudial axis thereof, an anode having a head portion and a stem portion, the said head portion extending outwardly over an end portion of said insulator and a stem portion extending through said aperture in said insulator and having a wall surface closely adjacent and parallel to the said inner wall surface of and parallel to the said inner wall surface of the inwardly extending flange to form therewith a recess, an annular resilient gasket arranged in each said recess, a flanged ring connected with said cover plate operable to press one of said gaskets into contact with said cover plate and inwardly into contact with the said parallel wall surface of said outwardly extending flange to form a gas tight joint therebetween, means comprising an annular ring member connected with said anode stem portion operable to press the other of said gaskets into contact with said insulator and inwardly into contact with said wall surface of said stem portion to form a gas tight joint therebetween, and an annular gasket interposed between said anode head portion and said end of said insulator, the said means being also operable to press the last said gasket into contact with said head portion and said end portion of said insulator.

2. In an electric current rectifier provided with a cover plate having an aperture therethrough formed with a plurality of shoulders having inner and outer parallel wall surfaces, an insulator having an aperture therethrough and supported on one of said shoulders, said insulator being formed with an outwardly extending flange intermediate the ends thereof having a wall surface extending parallel to the longitudinal axis thereof and arranged closely adjacent and parallel to the said inner wall surface of another of said shoulders to form a recess and an inwardly extending flange having inner and outer parallel wall surfaces extending parallel to the longitudinal axis thereof, an anode having a head portion extending over an end portion of said insulator and a stem portion extending through said aperture in said insulator and having a wall surface closely adjacent and parallel to the said inner wall surface of said inwardly extending flange to form therewith a recess, an annular resilient gasket arranged in each said recess, a flanged ring connected with said cover plate operable to press one of said gaskets into contact with said cover plate and inwardly into contact with the said wall surface of said outwardly extending flange to form a gas tight joint therebetween, means comprising an annular ring member connected with said anode stem portion operable to press the other of said gaskets into contact with said insulator and inwardly into contact with said wall surface of said stem portion to form a gas tight joint therebetween, and an annular gasket interposed between the said anode head portion and said end portion of said insulator, the said means being also operable to press the last said gasket into contact with said head portion and said end portion of said insulator, the said head and stem portions of said anode forming with the inner wall of said insulator an annular chamber, and the last said gasket being operative to prevent flow of vaporous material into said chamber from the casing of the rectifier.

STEFAN WIDMER.